Sept. 4, 1951 W. C. STARKEY 2,566,539
SPRING TYPE CLUTCH
Filed July 22, 1946

INVENTOR.
WILLIAM CARLETON STARKEY.
BY
Lockwood Goldsmith & Galt
ATTORNEYS.

Patented Sept. 4, 1951

2,566,539

UNITED STATES PATENT OFFICE 2,566,539

SPRING TYPE CLUTCH

William Carleton Starkey, Indianapolis, Ind.;
Fletcher Trust Company executor of said William Carleton Starkey, deceased Application July 22, 1946, Serial No. 685,469

5 Claims. (Cl. 192—41)

This invention relates to a torque transmitting device such as may include a spring or roller clutch of either the internal or external gripping type, wherein a clutch means is employed for transmitting power from a driving member to a driven member for relative movement in one direction while releasing the driving member from the driven member upon relative rotation in the opposite direction, or, more particularly, to permit overrunning of the driven member when the driving member is at rest, as disclosed in my Letters Patent No. 1,640,472, granted August 30, 1927, for Friction Clutch, and No. 2,336,757, granted December 14, 1943, for Spring Clutch. The invention is also applicable not only to the straight overrunning type of clutch, but also to the indexing type of clutch, as well as other various types of clutches which are normally out of engagement or disconnected from either the driving or driven elements, but dependent upon some outside source of energizing the clutch to bring about clutching engagement, of the character shown in applicant's Patent No. 2,257,987, granted October 7, 1941, entitled Clutch Construction.

The invention is primarily directed to a clutch wherein the driving and driven members have coaxially aligned cylindrical clutching surfaces, either internal or external, the clutch being common to both surfaces for transmitting or releasing the driving torque. In spring clutches of this character, and as shown in the above-mentioned Starkey Patent No. 1,640,472, the clutch spring traverses the line of separation between the two members; as in that patent, the line of separation cannot be over the width of the coil crossing from the driving to the driven member, and this one coil has to carry the total torque load. Thus, the driving torque and shearing action at the line of separation of the members overburdens the relatively narrow single coil of the spring overlapping the line of joinder. Consequently, the spring must be relatively heavy and substantial to permit a single coil thereof to sustain the load, or, conversely the torque load must be limited to that which may be transmitted through a single coil of the spring. Additionally, in use there is excessive wear developed on a single coil of the spring straddling the line of joinder of the members, such that at this point the spring and surfaces it clutches become galled and weakened.

To overcome this weakness and substantially increase the load carrying torque of the torque transmitting device relative to the dimensional characteristics and strength of the clutch, it was proposed in the above-mentioned Letters Patent No. 2,336,757, to strengthen the load carrying portion of the spring overlapping the line of joinder between the driving and driven members, by forming in the spring and as a part thereof the equivalent of a relatively wide coil in the form of a wide split sleeve having its ends formed helically with the same degree of pitch as the spring coils on either side thereof so that said sleeve became in effect one of the coils of the clutch spring. By reason thereof a substantially increased bearing surface is provided on each side of the line of joinder between the members with increased frictional capacity due to the increased bearing surface. While this had the advantage of increasing the torque load capable of being transmitted, it still constituted an element of the spring, or, in effect, a coil of greater bearing surface area and frictional capacity. Furthermore, from the standpoint of production the cost involved in producing the helical split sleeve, anchoring the other coils thereto and providing the desired reduced teaser ends of the spring, was excessive and in some instances prohibitive.

This invention accomplishes the results of the spring clutch as disclosed in the above-mentioned Letters Patent No. 1,640,472, embodying the advantages of the helical split sleeve of said Letters Patent No. 2,336,757, and in addition thereto still further increases the load carrying capacity of a spring of a given size. But more particularly, it greatly simplifies and reduces the cost of production of a clutch over that disclosed in the last-mentioned Letters Patent. This is accomplished by employing a single and continuous helically wound spring of simplified structure, such as shown in said first-mentioned Letters Patent, and supplementing said spring by an independent concentric yieldable band formed and assembled separately from the spring, which may be of any desired dimensions in respect to its bearing surface and frictional capacity as well as strength. Through such a band at least a half, if not a greater portion, of the torque load may be transmitted directly from the driving to the driven element, and to that extent relieves the load otherwise carried by the spring.

Thus, this invention provides a yieldable band as a separate floating element in respect to the clutch, which bridges the joinder line between the members and transmits a substantial portion of the torque load therebetween while protecting the clutch, particularly the load carrying coils of a spring clutch, from excessive frictional wear, galling and stresses. By means thereof a simple and inexpensive clutch may be employed in a clutch of a certain diameter transmitting at least twice the torque load permissible without the yieldable band, the clutch thereby having longer life due to the protection given by the band.

This split band type of clutch is also of outstanding value as a gradient clutching unit since the split band multiplies to a large degree the amount of contact area dissipating the heat during the clutching action. For example, without the split band the relatively narrow load carrying coil of the conventional clutch spring would carry the greater percentage of the total clutching load. Consequently, the clutching surfaces are subject to galling under the clutching load.

The full nature of the invention will be understood from the accompanying drawings and the following description and claims:

Figure 1:
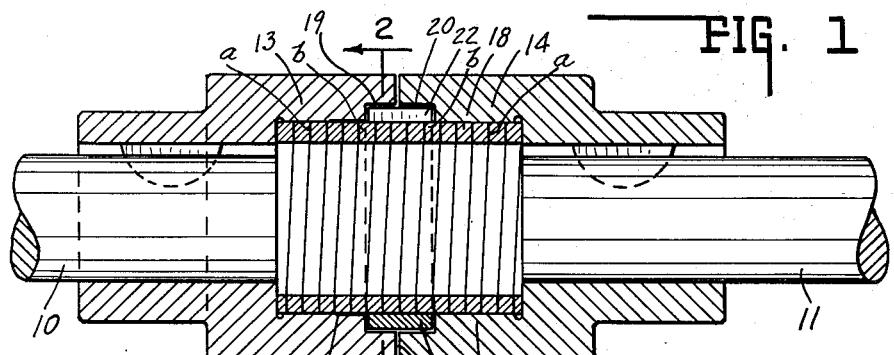
Fig. 1 is a central vertical section through one type of spring clutch with the shafts in elevation.
Figure 2:
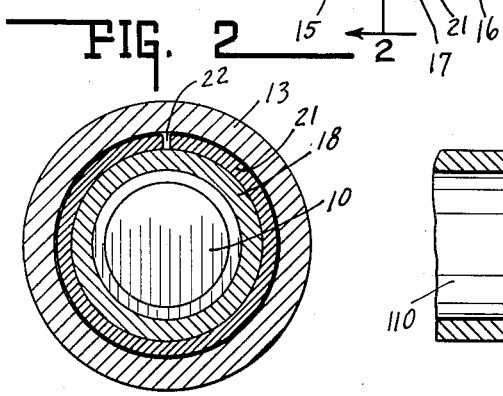
Fig. 2 is a section taken on the line 2—2 of Fig. 1.
Figure 3:
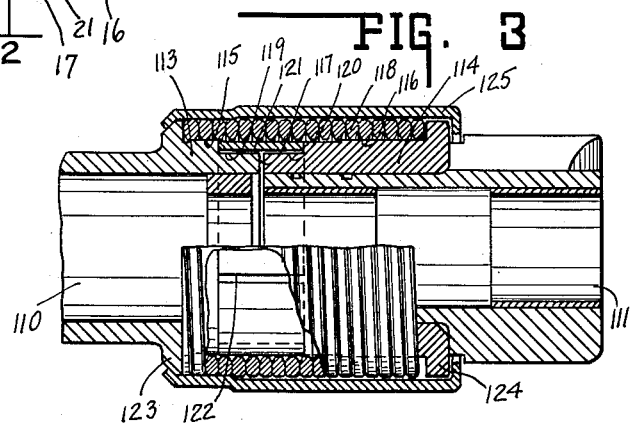
Fig. 3 is the same view as in Fig. 1, showing a modified form of spring clutch.
Figure 4:
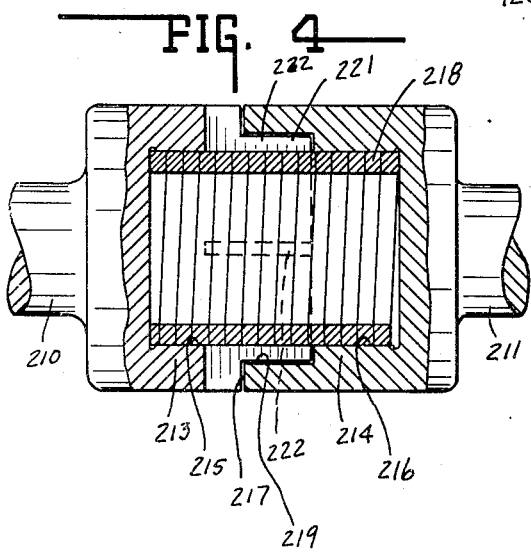
Fig. 4 is the same as Fig. 1, showing a second modified form thereof.

In the drawings, for purposes of illustrating some of the various embodiments of the invention, there is shown in Figs. 1 and 4, a simplified internal pocket type of overrunning clutch, whereas in Fig. 3 there is similarly shown a simple type of external overrunning clutch, both types being of a character which may be employed as an indexing clutch.

In Fig. 1 there is shown a driving shaft 10 and driven shaft 11. Keyed to the driving shaft there is a driving member provided with a pocket forming portion 13. Keyed to the driven shaft 11 there is a driven member comprising the pocket portion 14. Said driving and driven members are mounted in alignment to provide aligned concentric internal clutch surfaces 15 and 16, respectively. Their adjacent ends lie in substantial abutment at the joinder line 17.

Mounted within the pockets 13 and 14 to have a sliding fit with their clutch surfaces, there is shown a simple expansible type of coiled clutch spring 18. The open ends of the pockets 13 and 14 are offset or relieved to provide opposed offset recesses 19, 20, respectively, for jointly receiving therein a yieldable split band 21 split at 22.

Said split band functions as a radially movable torque transmitting clutch member which is normally in out of clutching relation to the internal clutch surfaces of the recesses 19, 20 but is expandable into clutching engagement therewith. In its normal contracted condition, its inner surface surrounds the clutch spring in bearing engagement therewith. Generally speaking, the thickness of the wall of the split band should be such as to have the same inside diameter when expanded outwardly into frictional engagement with the recesses 19, 20 as the inside diameter of the clutch surfaces 15, 16 of the respective pockets. In its normal condition, it would, therefore, have a smaller inside diameter than said pockets so as to be free of frictional clutching engagement with the recesses thereof, while the clutch is disengaged or overrunning so as to eliminate all overrunning friction of the band with the driving and driven members in their overrunning action.

When the driving member 10 is rotated relative to the driven member 11 in the overrunning direction, there will be a wrapping down tendency of the clutch spring 18 and the split band 21 will remain in light frictional engagement with those coils of the spring surrounded thereby. In this action, said band will be in its contracted condition free of clutching engagement with the recesses 19, 20. If, however, the driving member is rotated relative to the driven member in the clutching direction, then the clutch spring will be caused to start its expanding and clutching action at its respective ends through its building up portion a, expanding outward into firm frictional engagement with the clutch surfaces 15, 16 of their respective pockets. This action by the spring will direct a relatively high outward expanding force of its load carrying portion comprising the two respective turns or coils a of the clutch spring which cross from the clutch surfaces of the pockets over into the inner surface of the split band.

The above action of the spring will thereby expand the band under a built up maximum radial force (built up by the progressive expanding force of the coils a from the respective end coils toward the band), into intimate clutching engagement with the clutch surfaces of the recesses 19, 20. Thus, the maximum built up expanding force of the coils a will be transmitted to the load carrying coils b and the band 21 which in turn will act as the load transmitting medium directly between the two members.

By reason of this action through the co-action of the simple type of clutch spring and yieldable band, the spring may be relieved of at least half the torque load transmitted between the members, the split band directly transmitting at least half or more of the load and thereby relieving the spring. The relative torque load transmitted through the band and spring respectively, depends, however, upon the number of turns of the spring within the band and the ratios of coefficient of friction between the spring and band, on the one hand, and the band and the pockets, on the other hand. Thus, if the coefficient of friction is raised between the band and the pockets and lowered between the band and spring there being sufficient clutching action between the spring and respective pockets to prevent slippage within clutching direction, then the band would carry a greater portion of the torque load applied. One method to accomplish this would be to chrome plate the surface of the band which is to frictionally contact the clutch spring and thereby lower the coefficient of friction therebetween.

In Fig. 3 there is disclosed an external spring clutch wherein the clutch spring has an internal clutching surface for clutching engagement with an external clutch surface of the driving and driven members. As shown herein, there is a driving sleeve 110 and a driven sleeve 111, the driving sleeve having provided thereon a driving member comprising the stud 113, and the driven sleeve a driven member comprising the stud 114. The stud 113 is formed with a cylindrical external clutch surface 115 and the stud 114 is formed with an aligned concentric external clutch surface 116. Said studs have adjacent substantially abutting ends at their joinder line indicated at 117, both being surrounded by a clutch spring 118. The studs adjacent their ends are offset inwardly to provide the recesses 119, 120, respectively, having external cylindrical clutch surfaces for clutching engagement by the surrounding yieldable split band 121 split as indicated at 122. Spaced outwardly from the adjacent ends of the studs are spring retaining flanges 123 and 124 between which the clutch spring is located. Surrounding the clutch spring there is a retainer sleeve 125 with its ends flanged to embrace and be locked about the flanges of the studs. That portion of the sleeve 125 which surrounds the clutch surface 115 and the adjacent portion of the split band 121 is circumferentially reduced to clamp the surrounded coils of the spring into permanent clutching engagement with the stud 115.

The same principles of operation apply to the structure of Fig. 3 as above described in respect to Fig. 1, other than the clutch spring is wound down into clutching engagement with the clutch surface 116, its load carrying coils contracting the split band 121 to cause it to clutch the surfaces 119, 120 for transmitting substantially half the torque load between the driving and driven members.

In Fig. 4 there is shown a modified form of internal overrunning clutch, as in Fig. 1, but wherein the yieldable split band is an integral part of one of the pockets. Thus, for illustration there is shown a driving shaft 210, driven shaft 211, driving member in the form of the pocket 213 and driven member in the form of the pocket 214, said pockets being provided with the internal clutch surfaces 215 and 216, respectively. Their abutting ends are in coaxial alignment, having offset lines of joinder so that one of said pockets telescopes into the other. The clutch spring 218 has a sliding fit within the two pockets for clutching engagement with the internal clutch surfaces 215, 216. The telescoping end of one of the members, herein shown as the driving member 213, provides the yieldable clutch element or band 221 which is split longitudinally at intervals about its circumference, as indicated at 222 to function as a radially movable torque transmitting clutch member. The splits 222 extend beyond the joinder line indicated at 217 so that the telescoping portion of the band is freely yieldable to expand and contract. Normally said band is contracted out of clutching engagement with the internal clutch surface 219, being relieved of expanding pressure of the spring. As the spring expands, the yieldable band 221 is forced into clutching engagement with the clutch surface 219. Thus, that portion of the driving member which comprises the yieldable clutch band 221 acts to transmit a substantial portion of the load directly to the driven member 214 upon the clutch spring being expanded.

Figure 5:
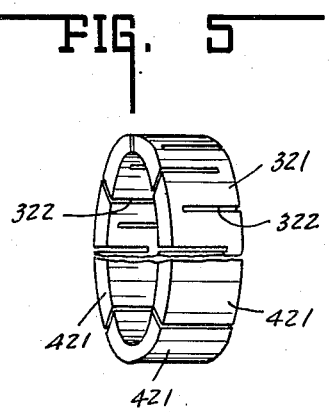
Fig. 5 is a perspective view of a modified form of yielding band.

In Fig. 5, the upper portion thereof, there is illustrated a further modification of the yieldable split band. Said band 321 is rendered yieldable for expansion or contraction through a series of staggered slots 322. Said yieldable band could also be similarly formed, as in Fig. 5, wherein two or more spaced slots 322 extend clear through the band separating it into a series of completely separated segmental portions indicated at 421 in the lower half of Fig. 5.

In addition to the yieldable split band serving with a simplified form of spring to transmit a substantial portion of the load, it additionally serves to hold the opposed pockets or studs in perfect alignment when the driving torque is being transmitted therebetween, thus compensating for any tendency of misalignment due to worn bearings in the unit as a whole. This is an additional advantage, particularly in this more simplified and economical form of structure.

From the foregoing, it will be observed that whereas the invention herein has been described as applied to mating pockets or studs, it is equally applicable to other types of clutches wherein it is desired to employ a yieldable split band to transmit a substantial part of the torque load between the members to thereby protect the load transmitting turns of the spring from strain and damage as by galling. Thus, in various forms and uses of spring clutch devices, the band may be employed to coact with the relatively narrow load carrying turns of the spring to protect them from galling and wear, and relieve them individually from the burden of transmitting a portion of the torque load. It will also be observed that the yieldable band may be of various forms, either an integral split band or a series of band segments or shoes such as shown in the lower half of Fig. 5, or a split portion of one of the members, as illustrated in Fig. 4.

Whereas the yieldable clutch band or like element has herein been shown and described in connection with a coiled clutch spring as one modification, it is similarly applicable to other clutch means such as roller clutch devices and the like in precisely the same arrangement and combination. It also may serve as a braking unit between the relatively rotatable members in the clutching direction, one of which may be fixed and the other rotatable. In such modification and application of the invention the split band or like element serves, in association with the clutch means or spring, to frictionally resist the relative rotation between the members in the nature of a braking unit.

The invention claimed is:

1. In a torque transmitting device, two relatively rotatable coaxial members, one having a substantially rigid drum, a torque transmitting radially movable helical friction element connected to the other of the members to turn therewith and adapted frictionally to engage the drum in a manner to prevent relative rotation of the members, and radially expansible and contractible friction means permanently connected to said other member to turn therewith and extending circumferentially of the drum for friction contact therewith, said means being operatively interposed between the drum and the helical element for operation by the helical element toward the drum in a manner to relieve the helical element of part of its torque load.

2. In a torque transmitting device, two relatively rotatable coaxial members extending generally end to end with the end portion of one of said members telescoping into the end portion of the other said member to provide overlapping end portions for surface to surface clutching engagement, one of said end portions being provided with a plurality of axially extending slots spaced thereabout, and a radially expansible and contractible clutch spring connected to one of said members extending into clutching engagement with the other said member, the intermediate load carrying portion thereof being radially engageable with said slotted end portion for actuation thereof into clutching engagement with the end portion of the other said member to transmit a portion of the torque load from one member to the other upon relative rotation of said members in the clutching direction.

3. In a torque transmitting device, two relatively rotatable coaxial members, one having a substantially rigid drum with an internal clutch surface terminating in a recessed portion adjacent the end thereof and the other said member having a reduced portion with a mating clutch surface telescoped within the recessed portion of said rigid drum, said telescoped portion having a series of slots spaced thereabout extending axially thereof, and a helical clutch spring extending into clutching engagement with said members having its intermediate load carrying portion engageable with the said telescoping slotted portion, said clutch spring being adapted to expand radially into clutching engagement with said members to transmit torque therebetween and expand said slotted portion into clutching engagement with the clutch surface of said recessed portion to transmit a torque load therethrough.

4. In a torque transmitting device, two relatively rotatable coaxial drums mounted end to end to provide contiguous clutch surfaces, a portion of one of said clutch surfaces adjacent the end thereof being recessed, a yieldable clutch band comprising an annular series of clutching segments movable radially independently of each other extending circumferentially of the recessed portion of said drum to overlap the end thereof, and a helical clutch spring having one end portion secured to one of said drums and the other end portion extending into clutching engagement with a clutch surface of the other of said drums, the intermediate load carrying portion thereof engaging the segments of said band for radially forcing them into clutching engagement with the recessed clutch surface upon relative rotation of said drums in the clutching direction.

5. In a torque transmitting device, two relatively rotatable coaxial drums mounted end to end to provide contiguous clutch surfaces, a portion of one of said clutch surfaces adjacent the end thereof being recessed, a yieldable clutch band comprising an annular series of clutching segments separated from each other by a plurality of transverse slots to permit said segments to move peripherally toward and from each other, said band extending circumferentially of said recesses to overlap the end thereof, and a helical clutch spring having one end portion secured to one of said drums and the other end portion extending into clutching engagement with a clutch surface of the other of said drums, the intermediate load carrying portion thereof engaging the segments of said band for radially forcing them into clutching engagement with the recessed clutch surface upon relative rotation of said drums in the clutching direction.

WILLIAM CARLETON STARKEY.

REFERENCES CITED

The following references are of record in the file of this patent:

UNITED STATES PATENTS

| Number | Name | Date |
|---|---|---|
| 1,640,472 | Starkey | Aug. 30, 1927 |
| 2,336,757 | Starkey | Dec. 14, 1943 |

FOREIGN PATENTS

| Number | Country | Date |
|---|---|---|
| 44,261 | Sweden | July 10, 1918 |